United States Patent [19]
Bogovican et al.

[11] Patent Number: 5,646,385
[45] Date of Patent: Jul. 8, 1997

[54] COLUMN MOUNTED SWITCH ASSEMBLY FOR A VEHICLE

[75] Inventors: Dragan Bogovican, Sterling Heights; Pavel Bucu, Clinton Township, both of Mich.

[73] Assignee: United Technologies Automotive, Inc., Dearborn, Mich.

[21] Appl. No.: 614,738

[22] Filed: Mar. 13, 1996

[51] Int. Cl.$^6$ ............................ H01H 3/16; H01H 21/76
[52] U.S. Cl. .................................. 200/61.27; 200/61.54
[58] Field of Search ........................... 200/4, 16 C, 16 D, 200/61.27–61.38, 61.54–61.57; 340/471

[56] References Cited

U.S. PATENT DOCUMENTS

| | | | |
|---|---|---|---|
| 3,187,119 | 6/1965 | Dyksterhouse | 200/16 C |
| 3,720,917 | 3/1973 | Dyksterhouse | 340/471 |
| 3,912,887 | 10/1975 | Gratz et al. | 200/16 D |
| 4,180,712 | 12/1979 | Lutzenberger et al. | 200/16 D |
| 4,296,286 | 10/1981 | Richardson | 200/61.54 |
| 4,417,107 | 11/1983 | Terajima | 200/16 C |
| 5,385,067 | 1/1995 | Wiersing et al. | 200/61.35 X |
| 5,546,067 | 8/1996 | Schmidt et al. | 200/4 X |
| 5,557,081 | 9/1996 | Clevenger et al. | 200/16 C X |

*Primary Examiner*—J. R. Scott
*Attorney, Agent, or Firm*—Howard & Howard

[57] ABSTRACT

A stalk switch assembly mountable on a steering column of a vehicle includes a base having a track mounting a control stalk. The control stalk includes a collar received on the track, which moves along the track. In a preferred embodiment, the track defines a pivot point for the control stalk, wherein the pivot point is spaced from the stalk and track. The control stalk makes selective electric contact with contact points on the base. When moving contacts come in contact with the electric contact points, the electric switch is actuated or is deactivated. This switch is most beneficially used for the turn signal of a vehicle.

19 Claims, 2 Drawing Sheets

COLUMN MOUNTED SWITCH ASSEMBLY FOR A VEHICLE

BACKGROUND OF THE INVENTION

The present invention relates to a relatively compact switch assembly mounted on the steering column of a vehicle to control one or more electrical functions including, for example, a turn signal function.

Stalk switches typically are mounted to a vehicle steering column, and pivot to provide an actuation control for turn signals on a vehicle. Turn signal control stalks typically also include multi-function switches from which a vehicle operator can control headlights, windshield wipers and washers.

A large number of electrical communications must be passed from the stalk switch. There are thus a number of contacts which must be made between the relatively pivoting surfaces of the moving stalk switch and the fixed steering column. In the prior art, the stalk switch is pivoted about a point intermediate the length of the switch. The electrical contacts were typically on one side of the pivot point, and the outer stalk switch was on the opposed side of the pivot point.

Vehicle manufacturers have been attempting to limit the range of angular movement of the stalk switch as it pivots between, for example, right turn, left turn and no turn positions. As the amount of movement of the outer end of the stalk switch is limited, the resulting movement of the contacts on the opposed side of the pivot point is also reduced. As the resultant movement of the contacts lessens, it becomes difficult to achieve proper timing between the several different contacts that are made and broken as the pivoting stalk switch moves. Moreover, the resulting size of the entire switch package is undesirably large.

SUMMARY OF THE INVENTION

A stalk switch assembly of the present invention provides high reliability within a narrow profile envelope for an electrical switch such as a turn signal. The assembly comprises a control stalk which is guided on a track. In a preferred embodiment, the switch functionally pivots about a point spaced from the stalk switch assembly.

The electrical contacts are positioned adjacent to the track. Thus, the electrical contacts move through almost the entirety of the movement of the stalk switch. The movement being guided on the track thus provides for more resultant movement of the electrical contacts. The electrical contacts may, thus, be relatively larger, and there may be more space between the contacts as they are made and broken such that proper timing between the several contacts can be achieved.

In a sense, since the stalk switch is guided on a track, the pivot point for the stalk switch is at a location spaced away from the track and off the stalk switch. Thus, less width is required for the stalk switch. Moreover, there is a great deal more movement of the contacts as described above.

In a preferred embodiment, the control stalk includes a locking point and an elongate collar disposed at a column end of the stalk. The collar is moveable along the track. Contacts associated with the collar make selective electrical connection with electric contact points disposed in the base of the stalk switch assembly.

In a disclosed embodiment, the locking point includes a bore which receives a spring and ball. The spring biases the ball toward the base, and into detents in the base. Two of the detents define "on" positions where associated contacts complete an electrical circuit to actuate the electrical switch. Another detent defines an "off" position where electrical circuit may or may not be made.

These and other features of the present invention will be best understood from the following specification and drawings, of which the following is a brief description.

DETAILED DESCRIPTION OF A PREFERRED EMBODIMENT OF THE INVENTION

Figure 1:
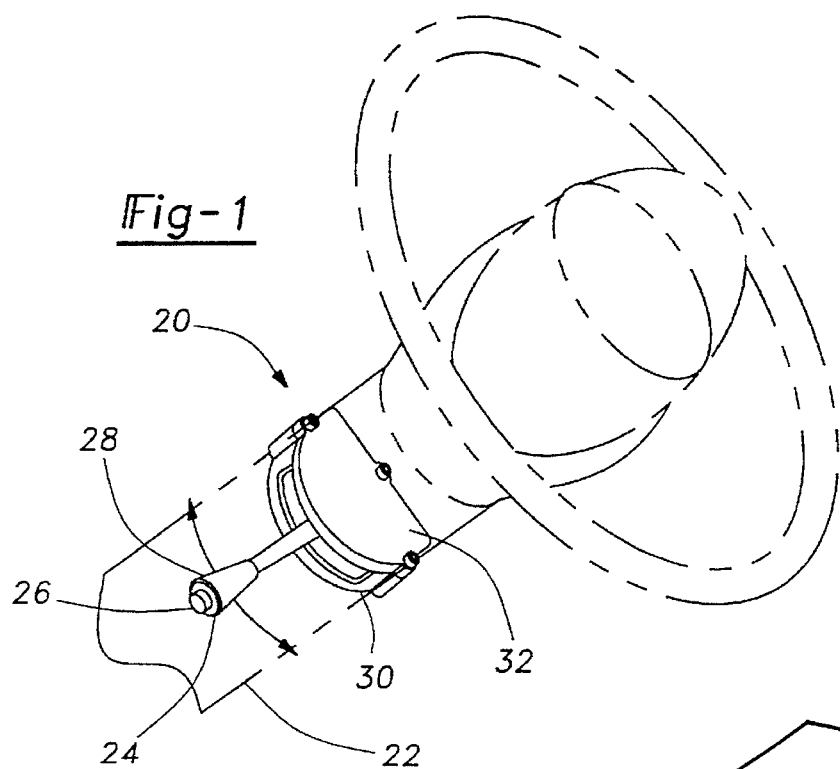
FIG. 1 is a perspective view of a stalk switch assembly according to the present invention mounted on a steering column of a vehicle.

Referring to FIG. 1, a stalk switch assembly 20 according to the present invention is shown mounted on a steering column 22 of a vehicle. The stalk switch 20 controls an electrical function generally by moving a control stalk 24. The control stalk 24 may contain switches to activate various additional electrical functions. For example, a wash function for a windshield wiper may be controlled by a button 26 disposed at a free end 28 of the control stalk 24. These multi-function stalk switch assemblies are well known in the art and form no part of the present invention.

Figure 2:
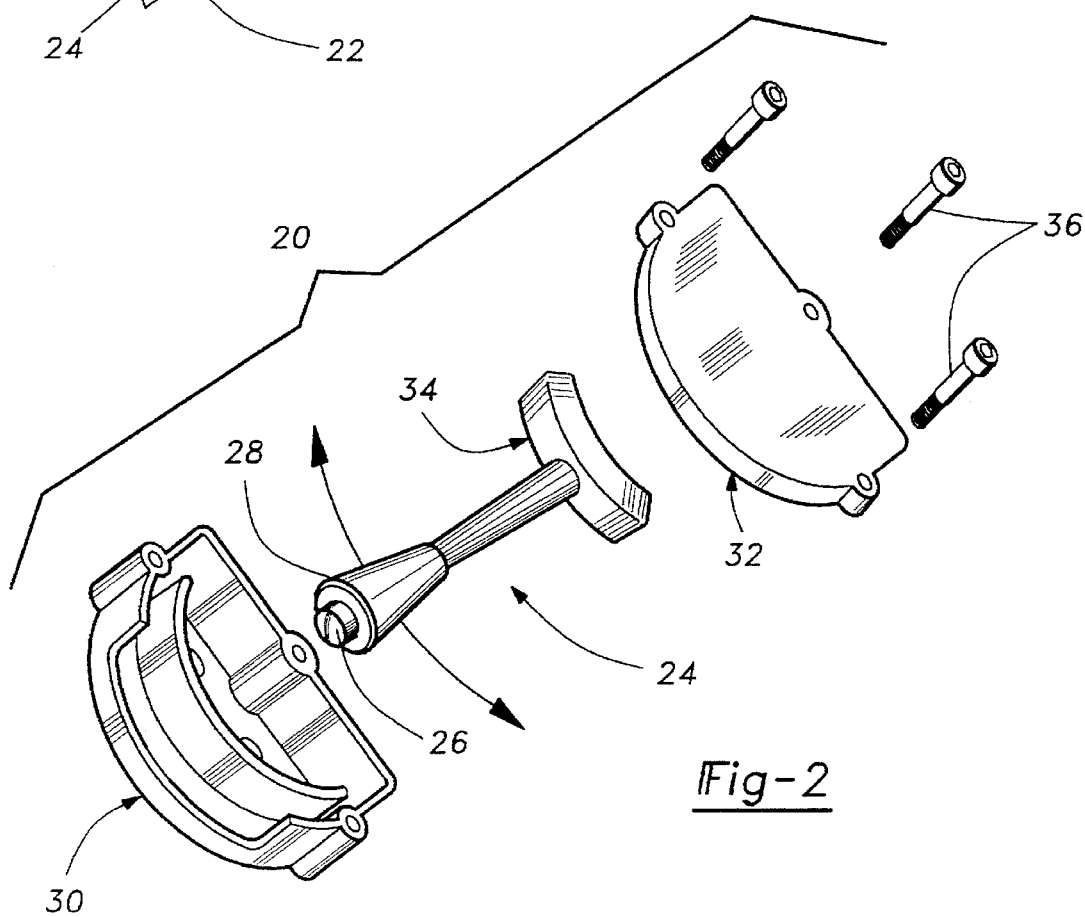
FIG. 2 is an exploded, perspective view of a stalk switch assembly according to the present invention.

As shown in FIG. 2, assembly 20 comprises the control stalk 24 with a column end 34 and a base including bracket 30 and cover plate 32. Column end 34 is received in the base in a manner which allows movement of control stalk 24 as explained in further detail below. Bolts 36 secure cover plate 32 to bracket 30 to form a housing for column end 34 of control stalk 24. Details of the housing are shown as an example, and other housings may be used.

Figure 3:
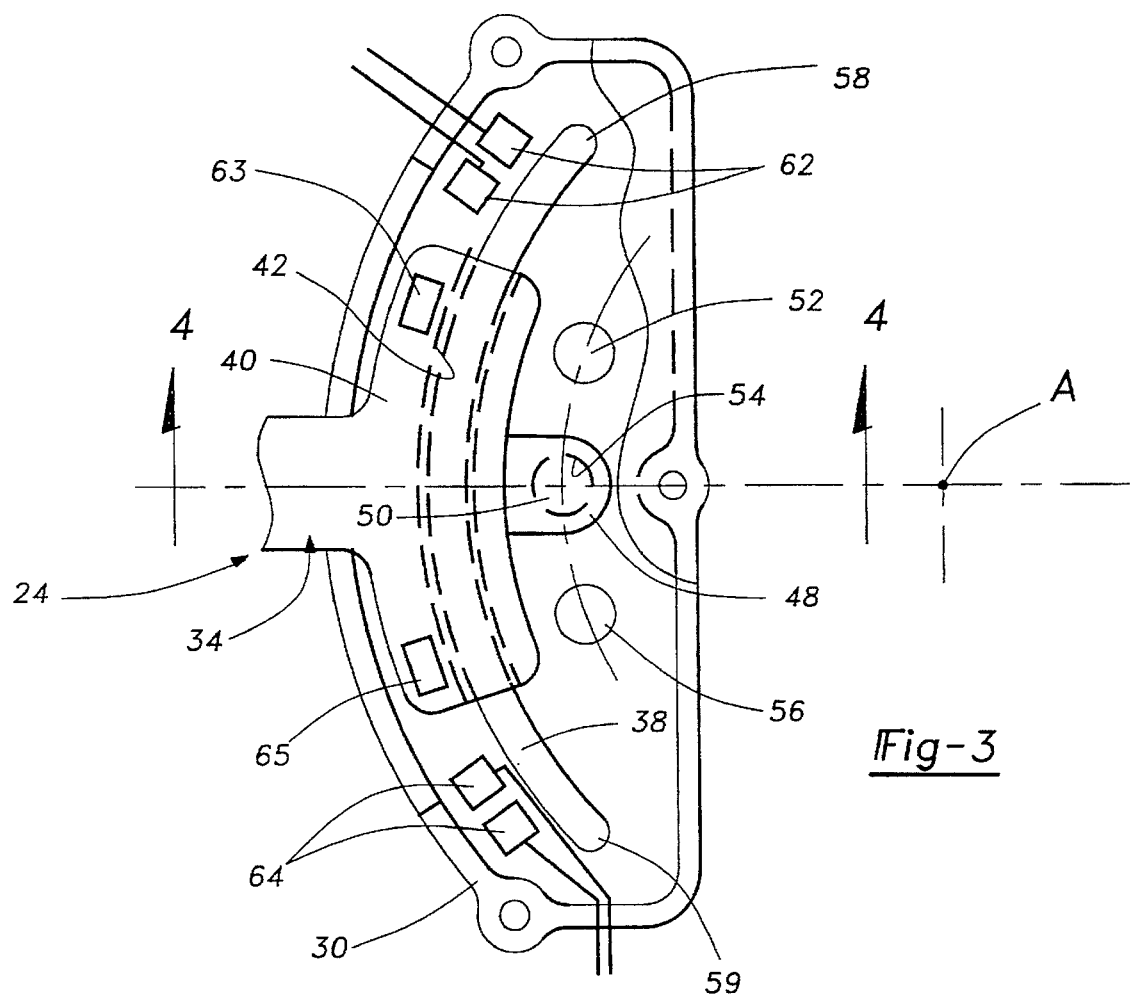
FIG. 3 is a fragmented, top plan view of a stalk switch assembly according to the present invention.

Referring now to FIG. 3, bracket 30 includes a track 38 which receives column end 34 and guides the movement of control stalk 24. Track 38 is preferably arc-shaped. Column end 34 of control stalk 24 includes a collar 40 which is received on track 38. Collar 40 comprises an elongate U-shaped channel 42, which also is shaped to follow the contour of track 38. When an operator pivots control stalk 24, collar 40 slides along track 38 and guides control stalk 24 to move in the plane of the paper of FIG. 3.

Figure 4:
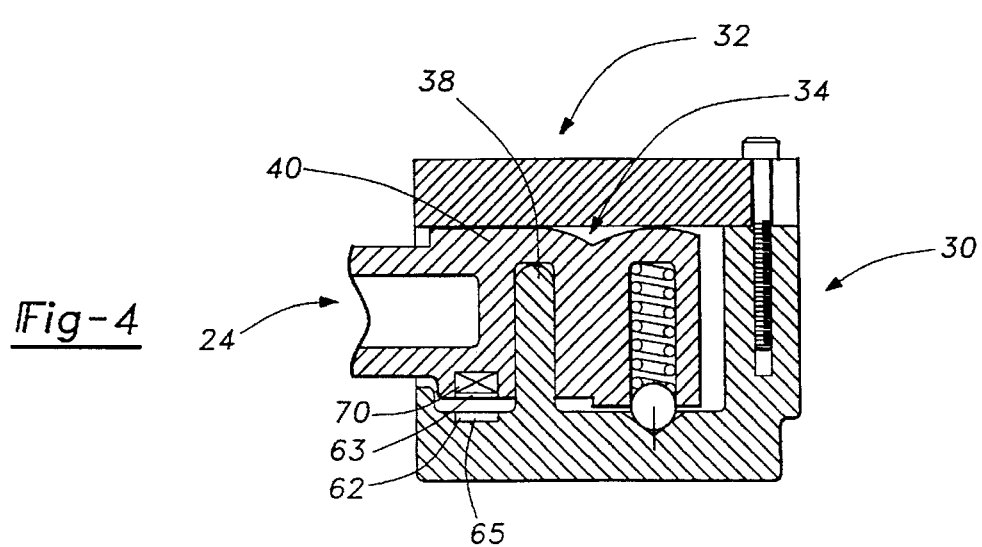
FIG. 4 is a cross-sectional view of the stalk switch assembly of FIG. 3 along view lines 4—4.

As shown in FIG. 4, control stalk 24 also includes a locking point 44 extending from a central position along collar 40. A spring 46 is disposed in a bore 48 and biases a ball 50 toward base 30. Base 30 has three detents 52, 54, 56 which receive ball 50 at different positions of the control stalk 24. Detents 52, 54, 56 are disposed in bracket 30 at spaced points and each define either an "on" or "off" position for the electrical switch.

Track 38 defines a functional pivot point A spaced from stalk switch assembly 20. Control stalk 24 pivots about pivot point A as collar 40 slides along track 38 between track ends 58 and 59. Pivot point A lies inward of the periphery of steering column 22 of the vehicle.

The movement of control stalk 24 between track ends 58 and 59 controls an electrical switch, and preferably a turn signal. In FIG. 3, control stalk 24 is shown in an "off" position. Ball 50 sits in detent 54.

As also shown, two spaced electrical contacts 62 are placed adjacent end 58 of track, and a moving contact 63 is placed on collar 40. At the same time, other spaced contacts 64 are formed adjacent end 59 of track, and a moving contact 65 is formed on collar 40 at that end. With the ball 50 in detent 54, the moving contacts 63 and 65 do not complete electrical circuits between the contacts 62 or the contacts 64. When the switch is moved to the on positions at the ends 58 and 59, the contacts 63 and 65 are selectively aligned to complete circuits between the spaced contacts 62 or the spaced contacts 64.

As shown in FIG. 4, the moving contacts 63 and 65 may be spring biased by spring 70 towards base 32. In FIG. 4, the positioning of the contacts 62 and 63 has been shifted such that they would fall within this cross section. As can be seen from FIG. 3, in fact, the contacts would be spaced into the paper in FIG. 4. Even so, they are illustrated in FIG. 4 to show their structure.

An operator may actuate the electrical switch by moving control stalk 24 toward either track end 58 or 59. For example, the operator of a vehicle may indicate a right hand turn by moving control stalk 24 in an upward fashion in FIGS. 1 and 3. Collar 40 slides along track 38 toward track end 58. Ball 50 moves out of detent 54 and along path 60 until ball 50 reaches detent 52. With ball 50 in detent 52 an electrical circuit between contacts 63 and 62 is completed to actuate a blinking light, and indicate a right hand turn. The operator of the vehicle may also actuate a second blinking light by moving control stalk 24 in a downward fashion toward track end 59 to indicate a left hand turn. From the position shown in FIG. 3, ball 50 moves out of detent 54 along path 60 to detent 56. With ball 50 in detent 56, an electrical circuit between contacts 65 and 64 is completed to actuate a blinking light to indicate a left hand turn signal.

The structure of the contacts 62, 63, 64 and 65 is greatly simplified to better illustrate its operation. In practice, all of the many electric signals that are sent from the stalk switch assembly 24 to a vehicle controller must pass through these relatively pivoting surfaces. Some contacts are made constantly, and others must be made or broken in proper timing relative to each other. The structure and relationship of these several contacts forms no portion of this invention, and would be within the skill of a worker in this art. It is the mounting of the switch on the guide which allows there to be a relatively great amount of movement of the contacts with a resultantly relatively small angular movement of the switch which is the main inventive feature of this invention. In addition, since the guide is spaced from the pivot point, the overall width of the entire switch is reduced from the prior art.

Although the stalk switch assembly is illustrated controlling an electrical switch for a turn signal, the stalk switch assembly of the present invention can be designed to control other electrical functions including windshield washer control, headlight control or speed control. Moreover, although the main benefits of this invention are in vehicle switches, other non-vehicle applications would exist.

A preferred description of this invention has been disclosed; however, a worker of ordinary skill in the art would recognize that certain modifications would come within the scope of this invention. For that reason, the following claims should be studied in order to determine the true scope and content of this invention.

We claim:

1. An electrical switch assembly to provide a turn signal indicator comprising:

a base having a track and at least two contact points;

a control stalk for controlling an electrical switch, said stalk having a collar at a column end of said stalk and a moving contact, said collar moveable along said track and guided by said track, said moving contact making selective electrical connection with said contact points as said collar moves along said track; and said base also including a plurality of detents, said control stalk being received within one of said detents at each location where said moving contact is aligned with one of said contact points to define one of two "on" positions for a turn signal indicator, and there being a third detent intermediate said "on" detents defining an "off" position wherein said moving contact is not aligned with one of said contact points.

2. An assembly as defined in claim 1, wherein said track is arc-shaped and said collar moves on said track about an arcuate path centered on a pivot point spaced from said control stalk and said track, and on a first side of said track, said control stalk extending from said collar on an opposed side of said track from said first side.

3. A stalk switch assembly as defined in claim 2, wherein said collar includes a U-shaped arcuate channel, said channel receiving said track.

4. An assembly as defined in claim 3, wherein a locking point is formed on said collar, and includes a bore which receives a spring and a locking member, said spring biasing said locking member toward said base.

5. An assembly as defined in claim 4, wherein said spring selectively biases said locking member into said detents.

6. An assembly as defined in claim 5, wherein said control stalk includes additional electrical switch controls.

7. A stalk switch assembly mountable on a steering column of a vehicle comprising:

a base having a arc-shaped track and two electric contact points;

a control stalk for controlling at least one electrical switch, said stalk having a collar at a column end of said stalk and a moving contact, said collar moveable along said track and guided by said track, said moving contact making selective electrical connection with said contact points as said collar moves along said track; and said track defining a pivot point for said stalk, said point being spaced from said stalk and said track, and said point being on a first side of said track, said stalk extending away from said collar on an opposed side of said track from said first side.

8. An assembly as defined in claim 7, wherein said collar including a U-shaped arcuate channel, said channel receiving said track.

9. An assembly as defined in claim 8, wherein said contact points are mounted between said pivot point and said track.

10. An assembly as defined in claim 9, wherein a locking point is formed on said collar, and includes a bore which receives a spring and a locking member, said spring biasing said locking member toward said base.

11. An assembly as defined in claim 10, wherein said base includes at least two detents associated with said contact points, and defining "on" positions for an electrical switch, said spring selectively biases said locking member into said detents and said moving contact then being associated with one of said contact points.

12. An assembly as defined in claim 11, wherein a third detent, intermediate said two detents, defines an "off" position.

13. An assembly as defined in claim 12, wherein said control stalk includes additional electrical switch controls.

14. A stalk switch assembly mountable on a steering column of a vehicle comprising:
- a base having an arc-shaped track and at least three detents, wherein two of said detents define "on" positions for a vehicle turn signal electrical switch;
- a control stalk for controlling said electrical switch, said stalk having a collar at a column end of said stalk and a locking point, said collar moveable along said track and guided by said track, said locking point being received in said detents as said collar moves along said track and wherein electrical connections are completed when said locking point is in one of said detents which define said "on" positions; and
- said track defining a pivot point for said stalk on a first side of said track said stalk extending from said collar on an opposed side of said track from said first side, said locking point being between said track and said pivot.

15. An assembly as defined in claim 14, wherein said collar including a U-shaped arcuate channel that receives said track, and said track securely guiding movement of said collar along said track.

16. An assembly as defined in claim 15, wherein said locking point is disposed centrally along said collar.

17. An assembly as defined in claim 16, wherein said locking point includes a bore which receives a spring and a locking member, said spring selectively biasing said locking member into said detents as said collar moves along said track.

18. An assembly as defined in claim 17, a third detent defining an "off" position is disposed between said detents associated with said on positions.

19. An assembly as defined in claim 18, wherein said control stalk includes additional electrical switch controls.

* * * * *